United States Patent
Werner et al.

(10) Patent No.: US 7,289,492 B1
(45) Date of Patent: Oct. 30, 2007

(54) SYSTEM AND METHOD FOR ESTABLISHING COMMUNICATION BETWEEN A COMMUNICATION DEVICE AND SERVICES OVER A PACKET-BASED COMMUNICATION NETWORK

(75) Inventors: Shane R. Werner, Olathe, KS (US); Ben Parker, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 240 days.

(21) Appl. No.: 11/123,513

(22) Filed: May 5, 2005

(51) Int. Cl.
*H04L 12/66* (2006.01)

(52) U.S. Cl. .................. 370/353; 370/352; 370/328; 370/329

(58) Field of Classification Search ............. 455/11.1, 455/41.2, 43.1, 465; 379/210.02; 370/209, 370/329, 352, 328
See application file for complete search history.

(56) References Cited

U.S. PATENT DOCUMENTS

| | | | |
|---|---|---|---|
| 7,076,209 B2 * | 7/2006 | Sugikawa et al. | 455/41.2 |
| 7,099,622 B2 * | 8/2006 | Meyer et al. | 455/11.1 |
| 7,127,244 B2 * | 10/2006 | Chin | 455/432.1 |
| 2003/0134650 A1 * | 7/2003 | Sundar et al. | 455/465 |
| 2006/0147015 A1 * | 7/2006 | Baumeister et al. | 379/210.02 |

* cited by examiner

*Primary Examiner*—Sanh D. Phu

(57) ABSTRACT

The present invention is a system and method for establishing and directing communication between a communication device and a service. In accordance with the present invention, a server is used to direct a communication device to a service for communicating across both circuit-based and packet-based networks. The server may direct the communication device to a service, or a service to a device. This allows different communication devices to communicate effectively using both circuit-based and packet-based networks.

21 Claims, 10 Drawing Sheets

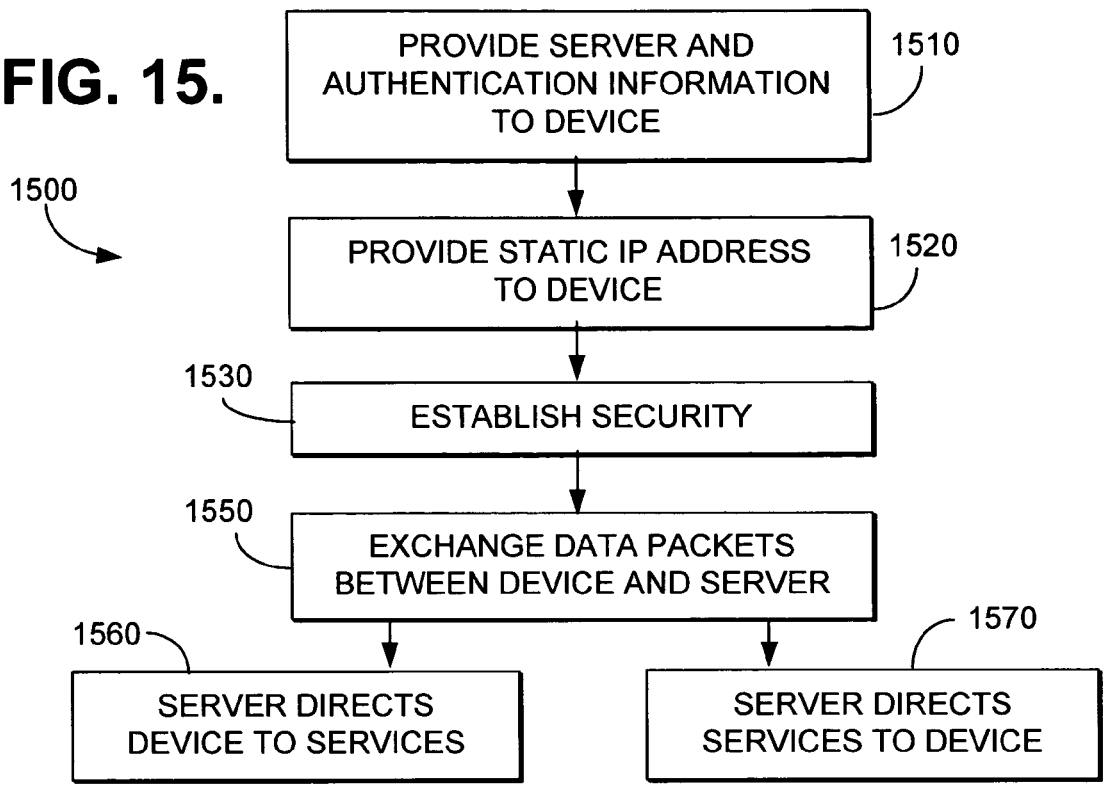
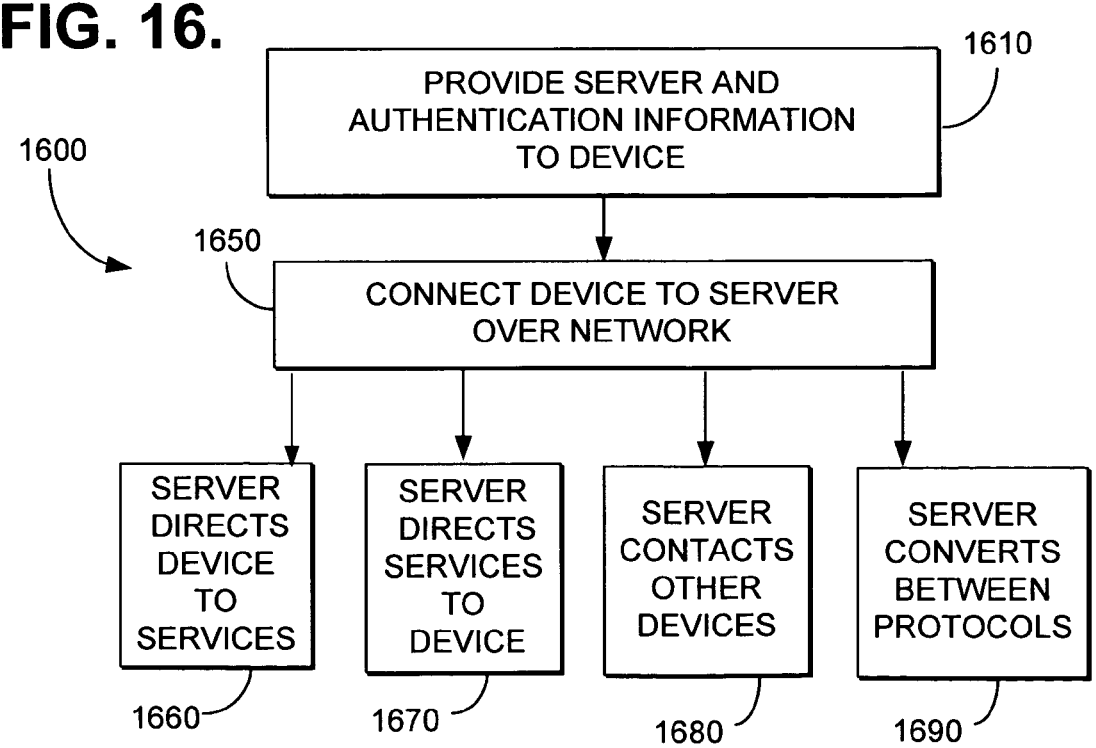

SYSTEM AND METHOD FOR ESTABLISHING COMMUNICATION BETWEEN A COMMUNICATION DEVICE AND SERVICES OVER A PACKET-BASED COMMUNICATION NETWORK

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to the field of telecommunications. More particularly, the present invention relates to the provision of packet-based communication over packet-based networks.

BACKGROUND OF THE INVENTION

For decades, circuit-based telecommunication networks have provided telecommunication services in the United States and throughout the world. Circuit-based telecommunication networks carry a voice telephone call by maintaining a circuit-based connection between the two participating telephones. Despite their long history of use, circuit-based networks suffer from shortcomings, such as inefficient use of resources and ineffective security. Circuit-based networks also are not well suited for routing information to a plurality of remote locations using the same telephone number. Circuit-based networks also are not well suited for maintaining communication between a plurality of endpoints without special adaptations. To the shortcomings of circuit-based networks, packet-based networks have been developed. Packet-based networks may provide for the efficient and secure transmission of data packets across a network. Instead of establishing a circuit-based connection between two telephones, a packet-based network transmits packets of data between two end points. One of the advantages to packet-based networks is the ability to transmit packets over a shared network without devoting an entire circuit to a single call. A packet-based network efficiently utilizes its resources during non-usage and quiet periods of call because resources are not dedicated to a call when there is no call activity. Packet-based networks may also provide security advantages over circuit-based networks. In a packet-based network, information may be sent in coded packets, which are more difficult to decode than traditional analog signals. Packet-based networks also provide an opportunity to provide a variety of communication types over the network, as the data in a packet may be for any application, such as voice telephony, text messaging, e-mail, streaming video, HTML documents, XML documents, or any other application. The large number of diverse types of communication possible using a packet-based network means that a generic "communication device" capable of conducting at least one type of packet-based communication may be used for communication rather than a telephone limited to one voice telephony. These services may be delivered to a communication device over wire-line or wireless packet-based communication networks.

Packet-based communication offers great potential for efficiently expanding communication capabilities. This expansion may be particularly beneficial to organizations, such as small businesses, that could use limited resources to establish a diverse, efficient, robust and secure packet-based communication system. For example, a packet-based communication system could integrate internal services such as intra-office e-mail, intra-office telephony, voice-mail, photocopying and other internal services with external services such as voice telephony, internet access, facsimile transmission, external e-mail, and other external services. However, the cost of hardware and software to provide such services effectively places the benefits of an integrated packet-based communication system beyond the reach of most small businesses.

The need exists, therefore, for a system and method that allows a communication device to access services through a packet-based network and that allows services to access a specific communication device through a packet-based network with minimal hardware and software requirements for the user.

BRIEF SUMMARY OF THE INVENTION

The present invention provides a system and method for establishing packet-based communication over a packet-based network using a communication device. Systems and methods in accordance with the present invention may direct communication devices to desired services, and may further direct services to desired communication devices. A system in accordance with the present invention may comprise a packet-based network and a server. When a communication device connects to the packet-based network it may exchange data packets with the server over the packet-based network. A communication device may request a desired service from the server, and the server may direct the communication device to the desired service. A service may request a communication device from the server, and the server may direct the service to the desired communication device.

BRIEF DESCRIPTION OF THE SEVERAL VIEWS OF THE DRAWING

The present invention is described in detail below with reference to the attached drawing figures, wherein:

FIG. 15 illustrates a further method in accordance with the present invention for establishing packet-based communication between a service and a communication device;

FIG. 16 illustrates a further method in accordance with the present invention for establishing packet-based communication between a service and a communication device;

DETAILED DESCRIPTION OF THE INVENTION

Figure 1:
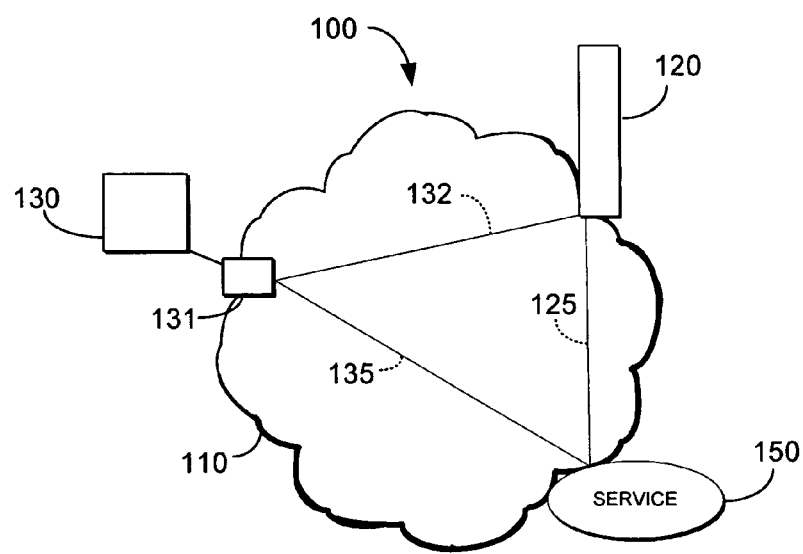
FIG. 1 illustrates a system in accordance with the present invention packet-based communication between a communication device and a service.

The present invention provides a system and method for establishing and conducting packet-based communication over a packet-based network using a communication device. A communication device may be any device capable of receiving and transmitting data packets. Examples of possible communication devices are wireless telephones, personal digital assistants, computers (desk top, lap top, tablet, or any other type), telephones, video conferencing equipment, or any other device capable of receiving and transmitting data packets over a packet-based network. A packet-based network may be any network using any transmission medium, combination of transmission media, equipment, or combination of equipment capable of transmitting data packets. For example, a packet-based network in accordance with the invention may be an IP network. When a communication device connects to a packet-based network, in accordance with the present invention, the communication device may transmit data packets to a server over the packet-based network. The packets transmitted from the communication device to the server over the packet-based network may identify the communication device to the server. The packets transmitted from the communication device to the server may also authenticate the communication device and establish a security protocol between the communication device and the server. Once the communication device is identified to the server, the server may, for example, assign a dynamic IP address to the communication device in order to properly address the communication device on the packet-based network. The transmission of data packets from a communication device to a server and the transmission of data packets from a server to a communication device may be referred to as a data packet exchange.

The communication device may also transmit data packets to the server requesting a service. A service may be any communication service, either now existing or later developed, such as voice telephony, voice-mail, text messaging, e-mail, video, audio or any other service. The server may direct the communication device to the service in a variety of ways. For example, the server may transmit data packets to the communication device instructing the communication device how to contact the desired service. By way of further example, the server may transmit data packets to the desired service instructing the service to contact the communication device requesting the service. By way of yet further example, the server may exchange data packets with both the communication device and the service acting as an intermediary. A service may also transmit data packets to the server requesting a particular communication device. The server may direct the service to the communication device in a variety of ways, similar to the ways the server may direct a communication device to a desired service.

FIGS. 1-12 illustrate examples of systems in accordance with the present invention. A packet-based network 110 provides the medium for establishing communication between networking components. Packet-based networks may be, for example, a local area network (LAN), metropolitan area network (MAN), wide area network (WAN), or a combination of networks. LAN's may be developed in localized environments, such as buildings or campuses. LAN's may be used for connecting computers, file servers, and other communication device, and may be configured using network adapters, hubs, and traditional copper-wire cabling such as, for example, coaxial and twisted-shielded pair wire. A MAN may provide a high speed intra-city data network that links locations within a campus, or city, and may be capable of extending several miles and operating at high data exchange rates. A WAN may be a public voice or data network extending beyond the MAN's limited distance, and may, for example, extend internationally. WAN's may utilize very high speed connections using data transmission technologies such as Frame Relay, ATM, and SONET and very high bandwidth connection media. One skilled in the art will appreciate that whether a packet-based network is a LAN, MAN, WAN, or some other type of network is immaterial to the present invention.

The packet-based network 110 may be comprised of one or more LANs, MANs, and WANs, or other networks located throughout the world. While packet-based network 110 may be a combination of multiple individual networks, network 110 need not be a combination of networks in accordance with the present invention. A communication device 130 may connect to packet-based network 110 through connection point 131. Connection point 131 may be a wired or wireless connection for accessing the packet-based network 110 by communication device 130. An example of a wireless connection point 131 is a mobile telephone tower. An example of a wired connection point 131 is a router. One skilled in the art will appreciate that connection point 131 may also be integrated with communication device 130. Connection point 131 may operate using any standard, and such as wireless standards, like blue tooth, infrared, Wi-fi, and 802.11, or wired standards such as RS-232, Parallel, and USB. Again, the scope of the present invention is not limited to any particular type of connection point 131.

At least one server 120 may communicate with communication device 130 over packet-based network 110 through connection point 131. One skilled in the art will appreciate that server 120 may comprise a plurality of servers, both to provide redundancy and to provide additional functionality. Communication device 130 and server 120 may communicate via data packet exchange 132 through packet based network 110. The data packet exchange 132 is illustrated using dashed lines to indicate that each packet in the exchange 132 may take a different route through packet-based network 110. One skilled in the art will appreciate that while data packet exchange 132 may sometimes be referred to as a "connection," but that data packet exchange 132 is not a circuit-based connection. Communication device 130 may identify and authenticate itself via data packet exchange 132 when connected to packet-based network 110. Communication device 130 may also request a service, receive a service, or receive direction to a service via data packet exchange 132. Server 120 may be one or more different type of computing servers connected to packet-based network 110. It should be noted that server 120 may optionally provide services itself, instead of or in addition to directing communication device 130 to services and directing services to communication device 130.

FIG. 1 illustrates a packet-based communication system 100 in accordance with the present invention. In the exemplary embodiment illustrated in FIG. 1, communication device 130 may request a service 150 from server 120 via data packet exchange 132. Server 120 may instruct communication device 130 on how to access service 130 via data packet exchange 132, and communication device 130 may access service 150 via a second data packet exchange 135. For example, communication device 130 may be a personal digital assistant (PDA) attempting to access a service 150 that provides e-mail to obtain e-mail over packet-based network 110. Server 120 may instruct communication device 130 on how to access e-mail service 150 via data packet exchange 132. Communication device 130 may execute instructions received from server 120 to contact e-mail service 150 via second packet exchange 135 to establish communication with service 150 for receiving e-mails via the second packet exchange 135. Alternatively, communication device 130 may request service 150 from server 120 via packet exchange 132. Server 120 may then contact service 150 via third data packet exchange 125. Third data packet exchange 125 may instruct service 150 to contact communication device 130. Service 150 may then contact communication device 130 via data packet exchange 135.

In a further example of a system in accordance with the present invention, server 120 may act as an intermediary between communication device 130 and service 150. In such a scenario, server 120 may also convert between formats and/or protocols to facilitate communication between communication device 130 and service 150. For example, a communication device 130 may request service 150 from server 120 via packet exchange 132. Server may then contact service 150 via third packet exchange 125. Communication device 130 and service 150 may then communicate via packet exchange 132, server 120, and third packet exchange 125.

Figure 2:
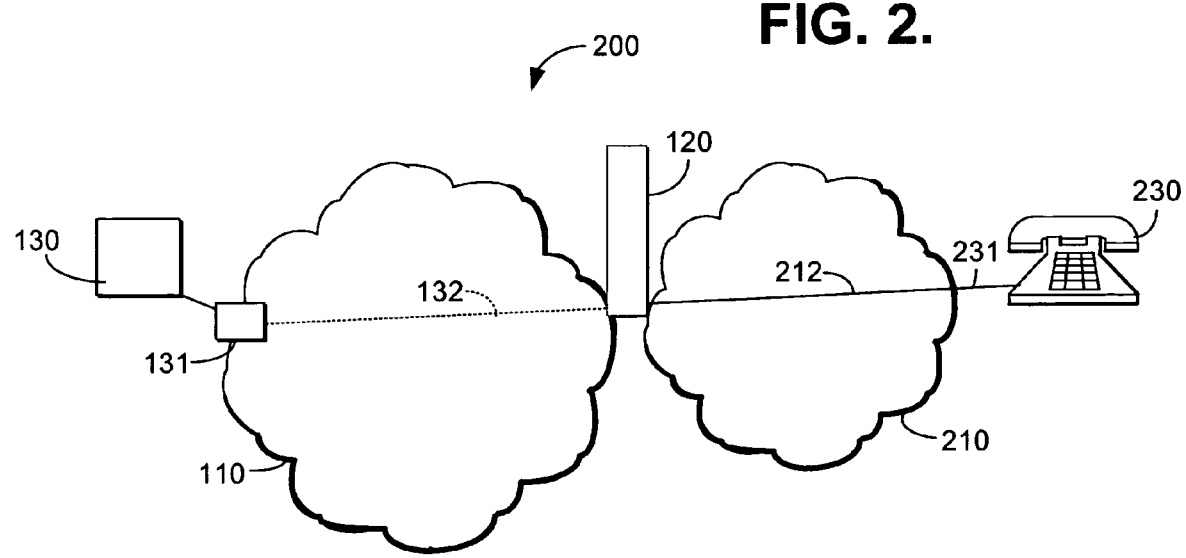
FIG. 2 further illustrates a system in accordance with the present invention for establishing packet-based communication between a communication device and a circuit-based telephone.

Referring now to FIG. 2, a further example of a system 200 in accordance with the present invention is illustrated. FIG. 2 illustrates a system establishing communication between a packet-based communication device 130 and circuit-based telephone 230. In the example illustrated in FIG. 2, server 120 provides the service, in this case the establishment of a circuit-based connection 212 over a circuit-based network and the conversion between packet-based and circuit-based communication. Communication device 130 connects to packet-based network 110 through connection point 131. Communication device 130 contacts server 120 via packet exchange through packet-based network 110. Communication device 130 may request a service from server 120, such as establishing a voice telephone call with circuit-based telephone 230. Server 120 may then form a circuit-based connection 212 with telephone 230 using the circuit-based telecommunication network 210. Server 120 may thereafter convert between the circuit-based connection 212 and the packet exchange 132 to allow communication device 130 to communicate with circuit-based telephone 230. Similarly, telephone 230 may call the communication device 130 using server 120 as a service for converting between circuit-based connection 212 and the packet exchange 132 in order to form communication between telephone 230 and communication device 130.

Figure 3:
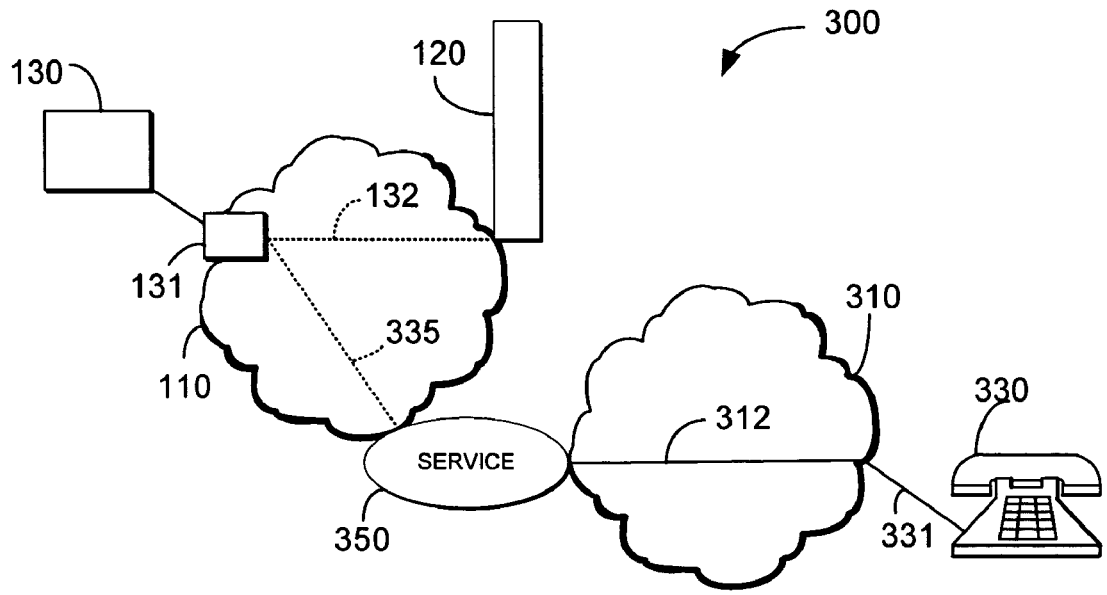
FIG. 3 further illustrates a system in accordance with the present invention for establishing packet-based communication between a communication device and a circuit-based telephone.

Referring now to FIG. 3, a further example of a system 300 in accordance with the present invention is illustrated. System 300 is a further example of a system 300 establishing communication between a packet-based communication device 130 and a circuit-based telephone 330. Communication device 130 connects to packet-based network 110 through connection point 131. Communication device 130 contacts server 120 via packet exchange 132 through packet-based network 110. Communication device 130 may request a service 350 from server 120 via packet exchange 132. Server 120 may instruct communication device 130 how to access service 350 via packet exchange 132. Based upon the instructions received from server 120, communication device 130 may initiate a second packet exchange 335 with service 350. In the example of system 300, service 350 may establish a circuit-based connection 312 with circuit-based telephone 330 and convert between circuit-based connection 312 with telephone 330 and packet exchange 335 with communication device 130 to enable communication device 130 to communicate with circuit-based telephone 330. One skilled in the art will appreciate that service 350 of providing communication with circuit-based telephone 330 is exemplary only, and that other types of services may be used with a system in accordance with the present invention.

Figure 4:
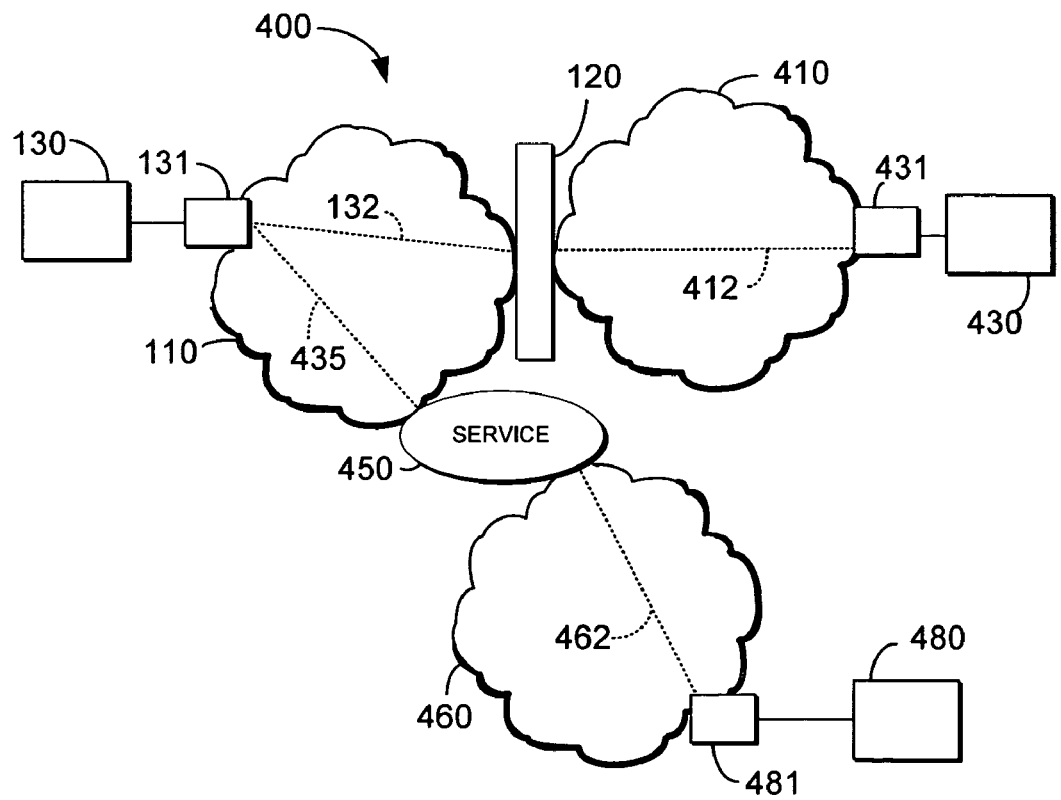
FIG. 4 further illustrates a system in accordance with the present invention for establishing packet-based communication between a plurality of communication devices.

Referring now to FIG. 4, a further system 400 in accordance with the present invention is illustrated. System 400 is an example of a system in accordance with the present invention whereby communication device 130 may communicate with a second communication device 430 connected to a second packet-based network 410 and a third communication device 480 connected to a third packet-based network 460. First communication device 130 may connect to packet-based network 110 via connection point 131, second communication device 430 may connect to second packet-based network 410 via connection point 431, and third communication device 480 may connect to third packet-based network via connection point 481. First communication device 130 may contact server 120 via packet exchange 132 through packet-based network 110. In packet exchange 132, communication device 130 may request a service from the server 120. In this example system 400, communication device 130 seeks one or more services to establish communication with both a second communication device 430 and a third communication device 480. Communication device 130 may identify second communication device 430 and third communication device 480 to server by telephone number, IP address, or any other designation in packet exchange 132. Server 120 may then determine how to establish communication between first communication device 130, second communication device 430, and third communication device 480. In the example of system 400, neither second communication device 430 nor third communication device 480 are connected to packet-based network 410.

Server 120 may establish communication between communication device 130 and second communication device 430 by providing a service of functioning as a gateway between packet-based network 110 and second packet-based network 410. Communication device 130 and second communication device 430 may then communicate via packet exchange 132 and second packet exchange 412 using server 120 as an intermediary.

Server 120 may establish communication between communication device 130 and third communication device 480 by instructing communication device 130 via packet exchange 132 to contact service 450. Communication device 130 may then contact service 450 via packet exchange 435 requesting communication with third communication device 480. Service 450 may then contact third communication device 480 via packet exchange 462. Communication device 130 and third communication device 480 may then communicate via packet exchange 435 and third packet exchange 462, with service 450 acting as an intermediary and converting, if necessary, between differing formats or protocols of packet exchange 435 and third packet exchange 462.

Figure 5:
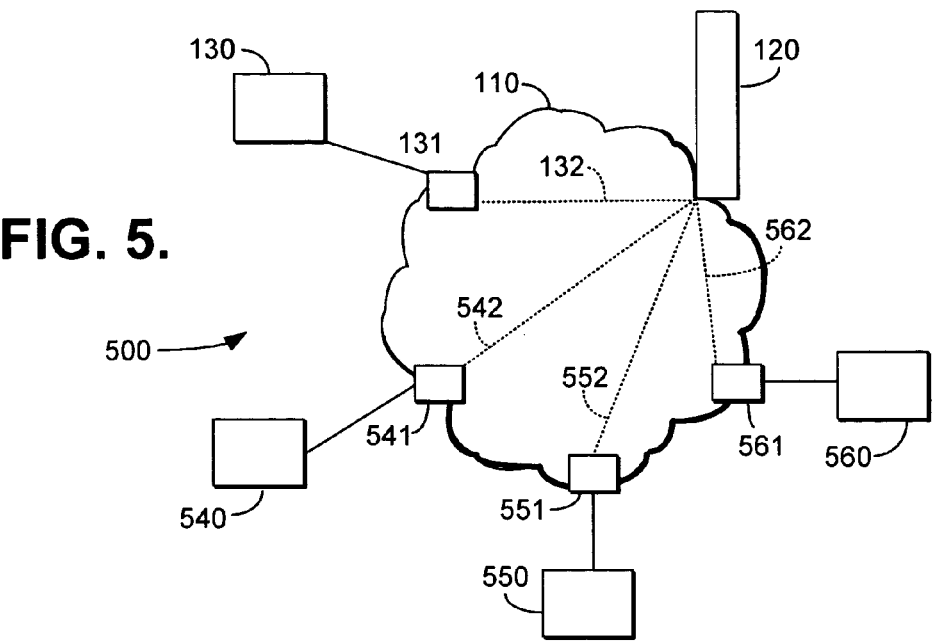
FIG. 5 further illustrates a system in accordance with the present invention for establishing packet-based communication between a plurality of communication devices.

FIG. 5 illustrates a further system 500 in accordance with the present invention for establishing packet-based communication between a plurality of communication devices. System 500 may establish communication between a first communication device 130, a second communication device 540, a third communication device 550, and a fourth communication device 560. In the example of system 500, all communication devices are connected to packet-based network 110. First communication device 130 may connect to packet-based network 110 via first connection point 131, second communication device 540 may connect to packet-based network 110 via second connection point 541, third communication device 550 may connect to packet-based network 110 via third connection point 551, and fourth communication device 560 may connect to packet-based network 110 via fourth connection point 561. First communication device 130 may contact server 120 via packet exchange 132. First communication device 130 may request server 120 to provide communication with second communication device 540, third communication device 550, and fourth communication device 560. One skilled in the art will appreciate that providing communication between a plurality of communication devices is a service that may be provided by the server, but that may also be provided by a separate service. Server 120 may establish communication with second communication device 540 via a second packet exchange 542, may establish communication with third communication device 550 via a third packet exchange 552, and may establish communication with fourth communication device 560 via a fourth packet exchange 562. Server 120 may function as an intermediary in packet exchanges between the communicating communication devices.

Figure 6:
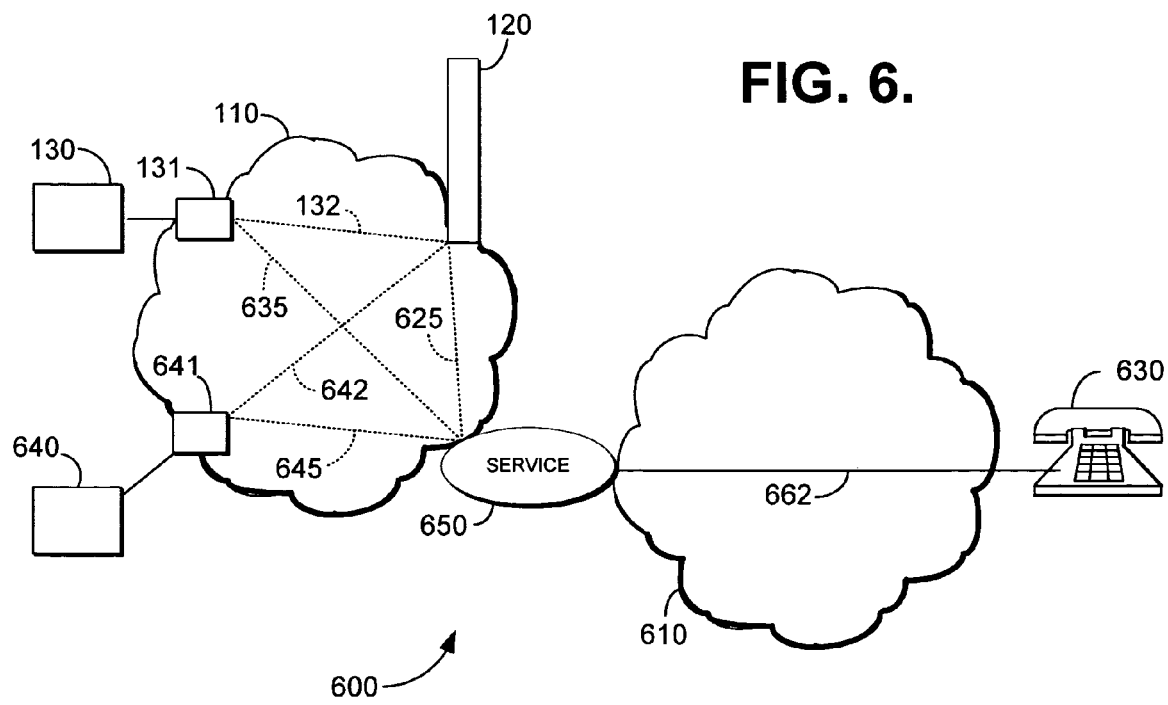
FIG. 6 further illustrates a system in accordance with the present invention for establishing packet-based communication between a plurality of communication devices and a circuit-based telephone.

Referring now to FIG. 6, a further system 600 in accordance with the present invention is illustrated. Exemplary system 600 may be used to establish communication between a combination of packet-based communication devices and circuit-based telephones, such as a first communication device 130, a second communication device 640, and a circuit-based telephone 630. First communication device 130 may connect to packet-based network 110 via first connection point 131. Second communication device may connect to packet-based network 110 via second connection point 641. First communication device 130 may request service 650 from server 120 via packet exchange 132. Service 650 may, for example, provide teleconferencing between a plurality of packet-based communication devices and/or circuit-based telephones. In requesting service 650 from server 120, first communication device 130 may identify to server 120, by telephone number or other identifier, the other desired communication participants, in this example second communication device 640 and circuit-based telephone 630. Server 120 may contact service 650 via a second packet exchange 625 to instruct service 650 to initiate communication between first communication device 130, second communication device 640, and circuit-based telephone 630. Service 650 may establish communication with first communication device 130 via packet exchange 635, may establish communication with second communication device 640 via packet exchange 645, and may establish communication with circuit-based telephone 630 via circuit-based connection 662. Service 650 may then serve as an intermediary in communication between first communication device 130, second communication device 640, and circuit-based telephone 630. Service 650 may further convert between circuit-based connection 662 and packet exchange 635 and packet exchange 645.

Referring now to FIGS. 7-10, further systems in accordance with the present invention are illustrated. FIGS. 7-10 illustrate an example of systems in accordance with the present invention that allow a single communication device 130 to communicate over a packet-based network 110 from multiple locations. Multiple locations may be, for example, a home, an office, a mobile connection, a hotel, or any other location. Communication device 130 may contact server 120 and inform server 120 of the location of communication device 130 via packet exchange 132 when communication device 130 connects to packet-based network 110 at a new location. Server 120 may thereafter direct services seeking communication device 130 to the appropriate location. One skilled in the art will appreciate that the routing of a voice call or other type of communication placed to a single number to the appropriate one of multiple locations is sometimes referred to as "find-me, follow-me."

Figure 7:
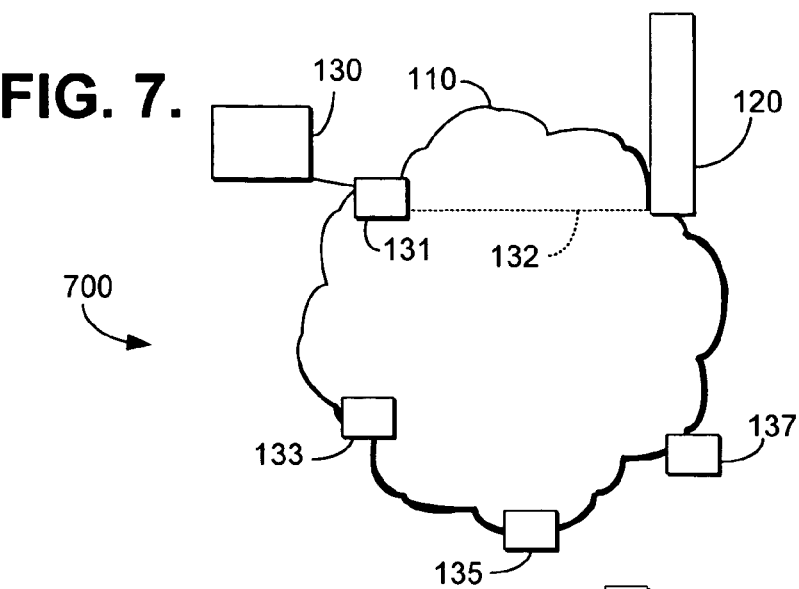
FIG. 7 illustrates a system in accordance with the present invention for establishing packet-based communication over a packet-based network with a communication device in one of a plurality of locations.

In FIG. 7, a system 700 in accordance with the present invention is illustrated. In the example of system 700, communication device 130 connects to packet-based network 110 via a first connection point 131, which may be at a first location, such as a user's home. Communication device 130 may contact server 120 via data packet exchange 132, and may inform server 120 of the location of communication device 130. For example, a user at home may place their communication device 130 in a cradle that serves as a connection point 131 to packet-based network 110. For example, the cradle may connect to a metropolitan area network that comprises part of the packet-based network 110. Communication device 130 may then contact server 120 via packet exchange 132 through the cradle and the MAN. In this example, the cradle serving as connection point 131 may also connect to communication device 130 using radio frequencies, such as those used for cordless telephones, while communication device 110 is within range of the cradle.

Figure 8:
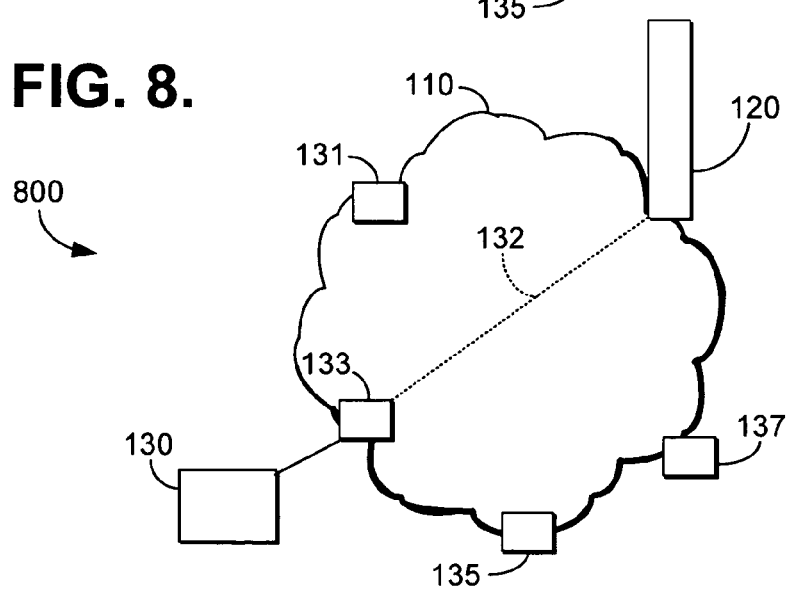
FIG. 8 further illustrates a system in accordance with the present invention for establishing packet-based communication over a packet-based network with a communication device in one of a plurality of locations.

Referring to FIG. 8, system 700 is illustrated with communication device 130 connected to packet-based network 110 at second connection point 133, which may be at a second location. Communication device 130 may contact server 120 via packet exchange 132, and may identify to server 120 the location of communication device 130. For example, second connection point 133 may be at the user's office. Second connection point 133 may, for example, utilize a wireless protocol to connect a user's communication device 130 to a local area network serving the user's office, the LAN comprising part of the packet-based network 110. In this example, when communication device 130 wirelessly connects to connection point 133, communication device 130 may contact server 120 via packet exchange 132. Server 120 may then direct services seeking communication device 130 to connection point 133.

Figure 9:
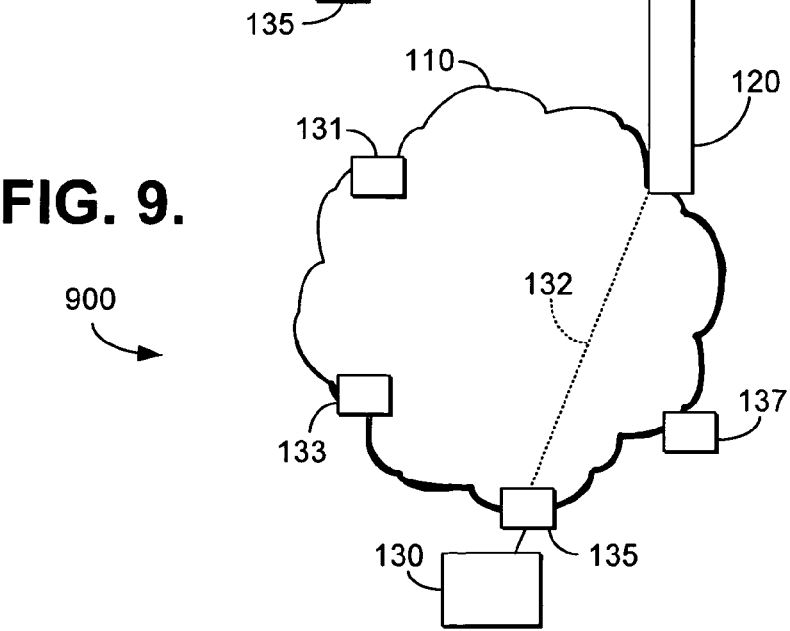
FIG. 9 further illustrates a system in accordance with the present invention for establishing packet-based communication over a packet-based network with a communication device in one of a plurality of locations.

Referring now to FIG. 9, system 700 is illustrated with communication device 130 connected to packet-based network 110 at a third connection point 135, which may be at a third location. Communication device 130 may contact server 120 via packet exchange 132, and may identify to server 120 the location of communication device 130. For example, third connection point 135 may be a mobile telephone tower between user's home and office. The mobile telephone network may comprise part of the packet-based network 110. During her commute home from the office, user's communication device 130 may exchange data packets with the mobile telephone tower using any mobile telephone protocol. Communication device 130 may connect to the mobile telephone tower and contact server 120 via packet exchange 132 over the wireless network. Server 120 may then direct services seeking communication device 130 to connection point 135.

Figure 10:
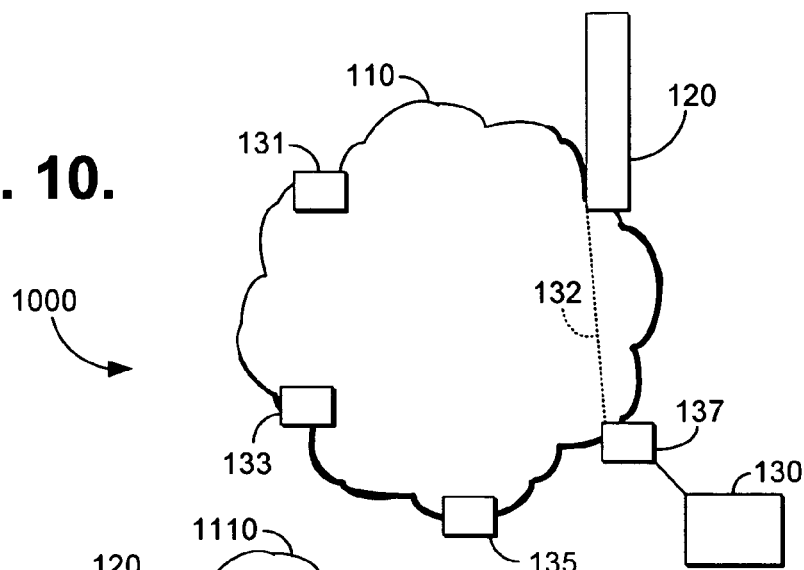
FIG. 10 further illustrates a system in accordance with the present invention for establishing packet-based communication over a packet-based network with a communication device in one of a plurality of locations.

In FIG. 10, system 700 is illustrated with communication device 130 connected to packet-based network 110 at fourth connection point 137, which may be at a fourth location. Communication device 130 may contact server 120 via packet exchange 132, and may identify to server 110 the location of communication device 130. For example, a user may be a guest at a hotel with a local area network, which comprises part of packet-based network 110. A user may connect communication device 130 to the hotel LAN via a connection point such as an Ethernet port. Communication device 130 may then contact server 120 via the hotel LAN to identify the location of communication device 130. Server 120 may then direct services seeking communication device 130 to connection point 137.

Figure 11:
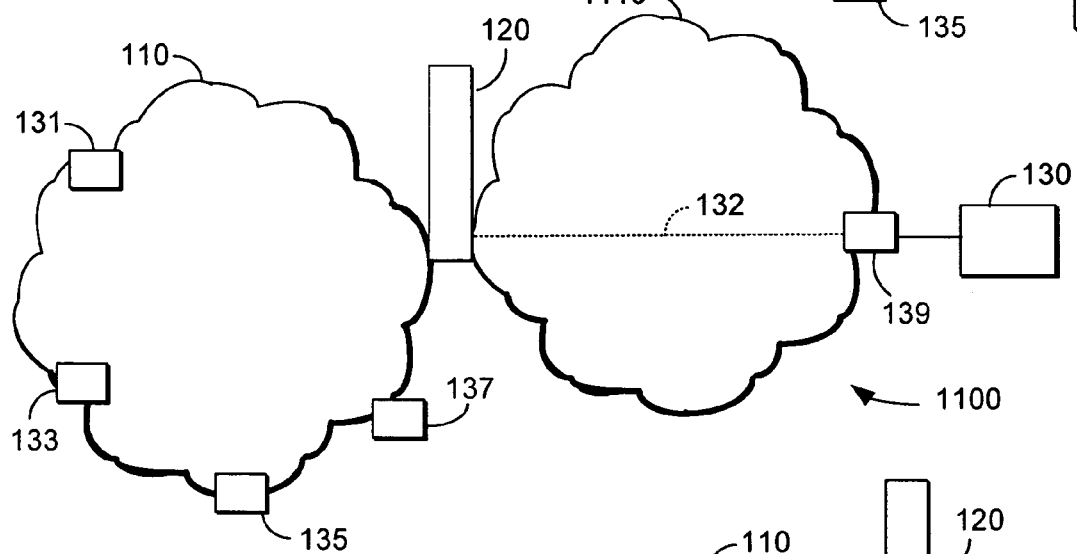
FIG. 11 further illustrates a system in accordance with the present invention for establishing packet-based communication over a second packet-based network with a communication device in one of a plurality of locations.

FIG. 11 illustrates a system 1100 for establishing communication between a communication device 130 and server 120 using a second packet-based network 1110. The example illustrated in FIG. 11 may occur, for example, if communication device 130 is capable of operating as a mobile telephone and accesses a roam network, such as second packet-based network 1110, which may happen, for example, if the wireless network of the user's telecommunication provider is not available at a given location. Communication device 130 may contact server 120 via packet exchange over second packet-based network 1110, and may identify to server 120 the location of communication device 130. After receiving packet exchange 132 from communication device 130 identifying the location of connection point 139 server 120 may direct services, such as telephone calls, to communication device 130 at its most current location.

Figure 12:
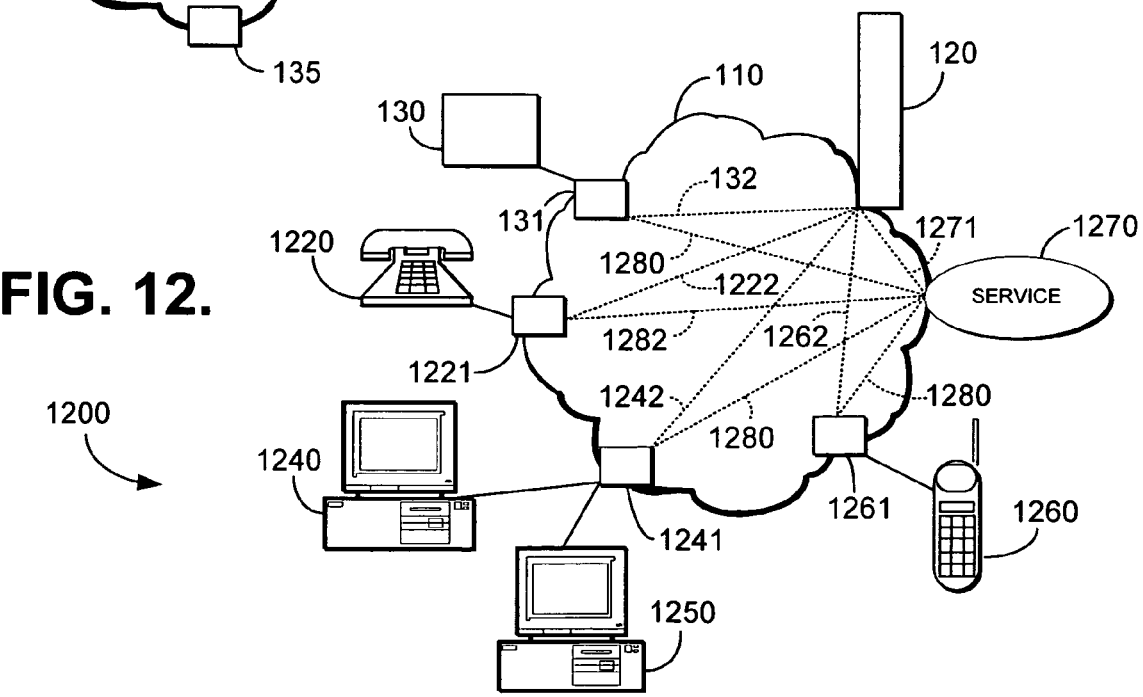
FIG. 12 illustrates a system in accordance with the present invention for establishing packet-based communication between a plurality of communication devices.

Referring now to FIG. 12, a further system 1200 in accordance with the present invention is illustrated. In the example of system 1200, a communication device 130, a packet-based telephone 1220, a first computer 1240, a second computer 1250, and a mobile phone 1260 communication over packet-based network 110. The example of FIG. 12 may be, for example, all or part of the communication equipment of a small business. For example, communication device 130 may be a tablet PC that connects to connection point 131. Connection point 130 may be, for example, a wireless hub, for use in a warehouse. Communication device 130 may contact server 120 via packet exchange 132. Communication device 130 may request service 1270 from server 120. Service 1270 may be, for example, an inventory management database for use in monitoring warehouse contents.

Packet-based telephone 1220 may connect to packet-based network 110 through connection point 1221. Packet-based telephone 1220 may be, for example, a telephone in the small business front office used, for example, to receive customer calls. Packet-based telephone 1220 may contact server 120 via packet exchange 1222 to request service 1272, that may be, for example, a voice over IP service. Server 120 may instruct packet-based telephone 1220 via packet exchange 1220 how to contact service 1272. Packet-based telephone 1220 may then follow the instructions received from server 120 and contact service 1272 via packet exchange 1282.

First computer 1240 and second computer 1250 may connect to packet-based network 110 through a shared connection point 1241. For example, first computer 1240 and second computer 1250 may contact server 120 via packet exchange 1242. First computer 1240 and second computer 1250 may request both service 1270 and service 1272. Service 1272 may be a voice over IP service enabling calls to be made using a computer equipped with an appropriate headset to conduct voice telephone calls, and service 1270 may be a database service for managing inventory in the small business' warehouse. In this example, individuals in the call center may use computers such as first computer 1240 and second computer 1250 to conduct voice telephone calls to prospective customers using service 1272 and verify availability and process orders using service 1270.

Mobile telephone 1260 may connect to packet-based network 110 through connection point 1261. For example, mobile telephone 1260 may be used by the small business' sales representative, and connection point 1261 may be, for example, a mobile telephone tower. Mobile telephone 1260 may contact server 120 via packet-exchange 1262 and may request service 1272. Service 1272 may be, for example, a voice over IP service that permits packet based voice telephony calls to be placed or received using mobile telephone 1260.

In the example of system 1200, it should be noted that the number and types of communication devices may vary from those illustrated in FIG. 12. It should be further noted that packet-based network 110, in the example of system 1200 and in other systems in accordance with the present invention, may be a combination of packet-based networks. For example, in the example of system 1200 in FIG. 12, packet-based network 110 may comprise a combination of a packet-based mobile telephone network, several LANs (for example, separate LANs in a warehouse, a front office, and a call center) connected via a WAN or MAN, or over other packet-based connections.

Figure 13:
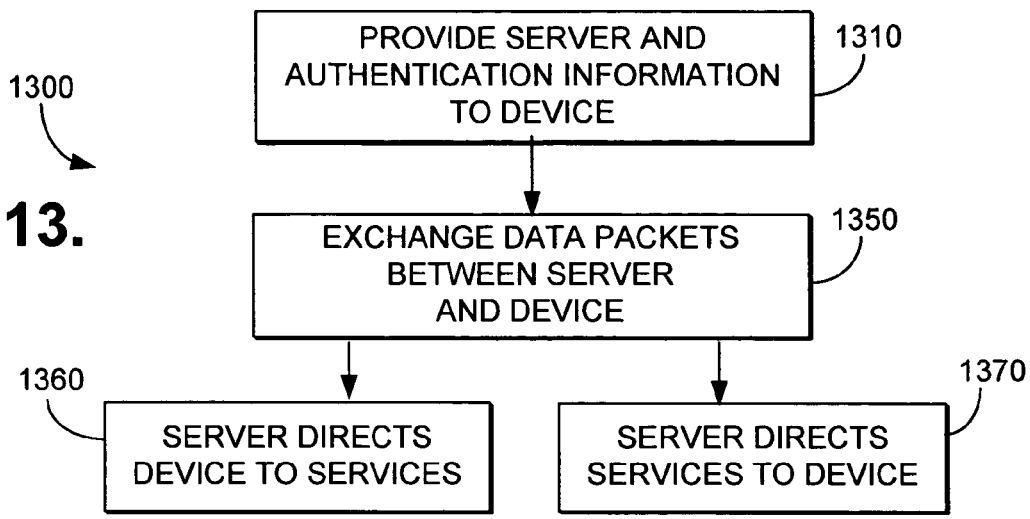
FIG. 13 illustrates a method in accordance with the present invention for establishing packet-based communication between a service and a communication device.

Referring now to FIG. 13, a method 1300 in accordance with the present invention for establishing packet-based communication using a communication device. One skilled in the art will appreciate that a communication device used with a method in accordance with the present invention, such as method 1300, may be any device capable of receiving and transmitting data packets. In step 1310, server and/or authentication information may be provided to the communication device. Step 1310 may occur, for example, when a communication device is activated by a telecommunication service provider. Server information may comprise sufficient information to enable the communication device to contact the server via a packet exchange when the communication device is connected to a packet-based network. Server information may comprise, for example, an IP address associated with the server. Authentication information may be used to authenticate the communication device to the server and/or to establish secure communication with the server. One skilled in the art will note that authentication information may be omitted, but will appreciate that such an omission may detrimentally impact the security of communication in accordance with the present invention. In step 1350, the communication device and server may exchange data packets. An exchange in data packets may occur when the communication device connects to a packet-based network. The communication device may direct packets to the server in step 1350 using the server information provided in step 1310. The data packet exchange of step 1350 may also comprise the exchange of authentication/security information. The exchange of data packets between the communication device and server of step 1350 may also include a request for a service from the communication device to the server. The server may direct communication device to a service in step 1360. Step 1360 may occur, for example, in response to a request to the server from the communication device for a given service. The server may direct a service to the communication device in step 1370. Step 1370 may occur, for example, in response to a request to the server from the service for a given communication device.

Figure 14:
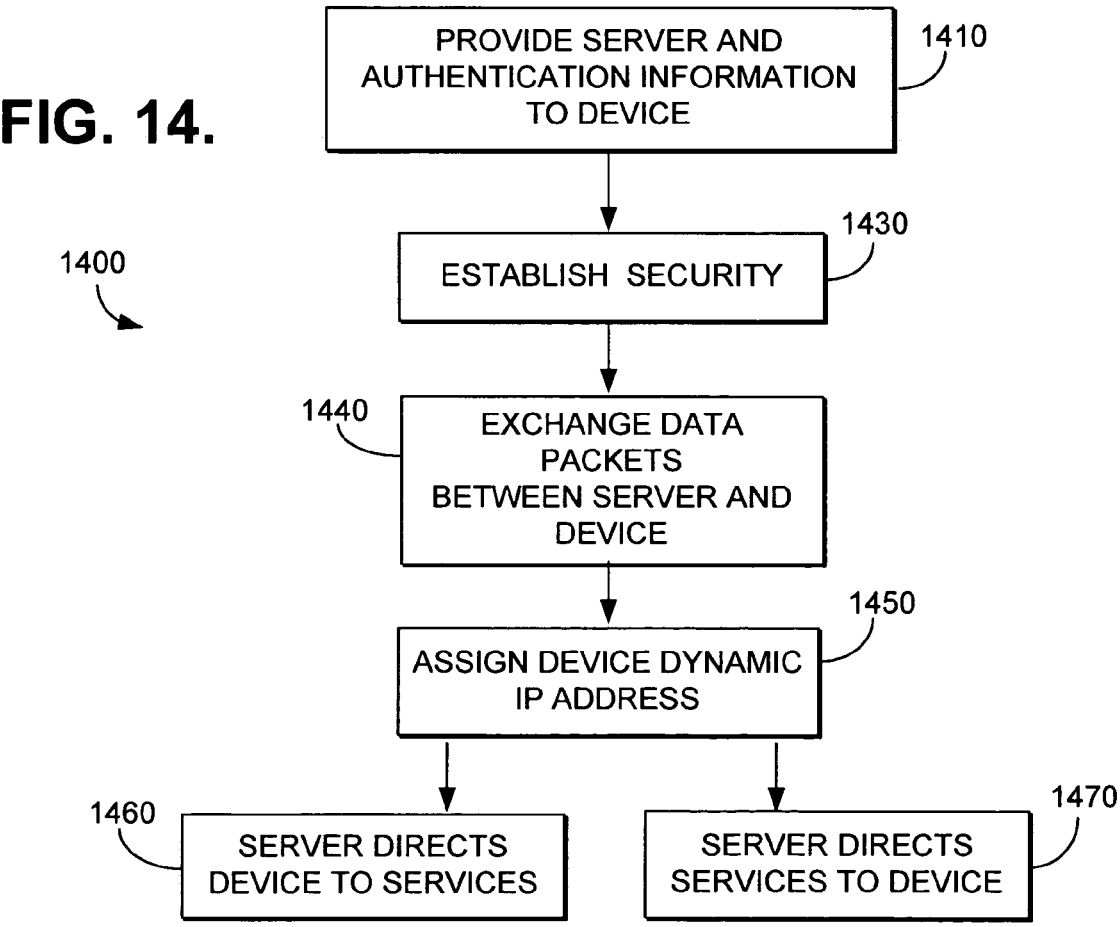
FIG. 14 illustrates a further method in accordance with the present invention for establishing packet-based communication between a service and a communication device.

FIG. 14 illustrates a further method 1400 in accordance with the present invention for establishing packet-based communication using a communication device. In step 1410 server information is provided to the communication device. The communication information provided in step 1410 may comprise sufficient information to enable the communication device to contact the server via packet exchange when the communication device is connected to a packet-based network. Server information may comprise, for example, and IP address associated with the server. Authentication information may be used to authenticate the communication device to the server and to establish secure communication with the server. In step 1430, secure communication may be established between the communication device and the server using the authentication information. Secure communication between the communication device and the server may be established through any method, such as encryption, and may use any protocol of standard, such as Closed User Group (CUG) Virtual Private Network (VPN), TCP/IP, Frame Relay, or ATM networking. In step 1440, the communication device and server may exchange data packets. The communication device may direct packets to the server in step 1340 using the server information provided in step 1410. In step 1450, the server may assign the communication device a dynamic IP address. The dynamic IP address may be used, for example, for the server to direct services to the communication device. The server may direct communication device to a service in step 1460. Step 1460 may occur, for example, in response to a request to the server from the communication device for a given service. The server may direct a service to the communication device in step 1470, step 1470 may occur, for example, in response to a request to the server from the service for a given communication device.

Referring now to FIG. 15, a further method 1500 in accordance with the present invention for establishing packet-based communication using a communication device. In step 1510, server and authentication information may be provided to the communication device. A static IP address may be provided to the communication device in step 1520. Step 1520 of providing communication device with a static IP address may occur in conjunction with step 1510, but may occur at other times as well. In step 1530, secure communication may be established between the communication device and the server using the authentication information. Secure communication between the communication device and the server may be established through any method, such as encryption, and may use any protocol or standard, such as Closed User Group (CUG) Virtual Private Network (VPN), TCP/IP, Frame Relay, or ATM networking. In step 1550, the communication device and server may exchange data packets. The communication device may direct packets to the server in step 1550 using server information provided in step 1510. The server may direct the communication device to a service in step 1560. Step 1560 may occur, for example, in response to a request to the server from the communication device for a given service. The server may direct a service to the communication device in step 1570. Step 1570 may occur, for example, in response to a request to the server from the service for a given communication device.

Referring now to FIG. 16, a further method 1600 in accordance with the present invention for establishing packet-based communication using a communication device is illustrated. In step 1610, server and authentication information may be provided to the communication device. In step 1650, the communication device and server may exchange data packets. The communication device may direct packets to the server in step 1650 using server information provided in step 1610. In step 1660, the server may direct the communication device to a service. In step 1670, the server may direct a service to the communication device. In step 1680, the server may contact other communication devices to allow the communication device to communicate with the other communication devices. Step 1680 may also be thought of as providing a service to a communication device. In step 1690, the server may convert between protocols allowing, for example, a device to communicate across a different network or with a communication device or service employing different protocols. Step 1690 may also be thought of as providing a service to a communication device.

Figure 17:
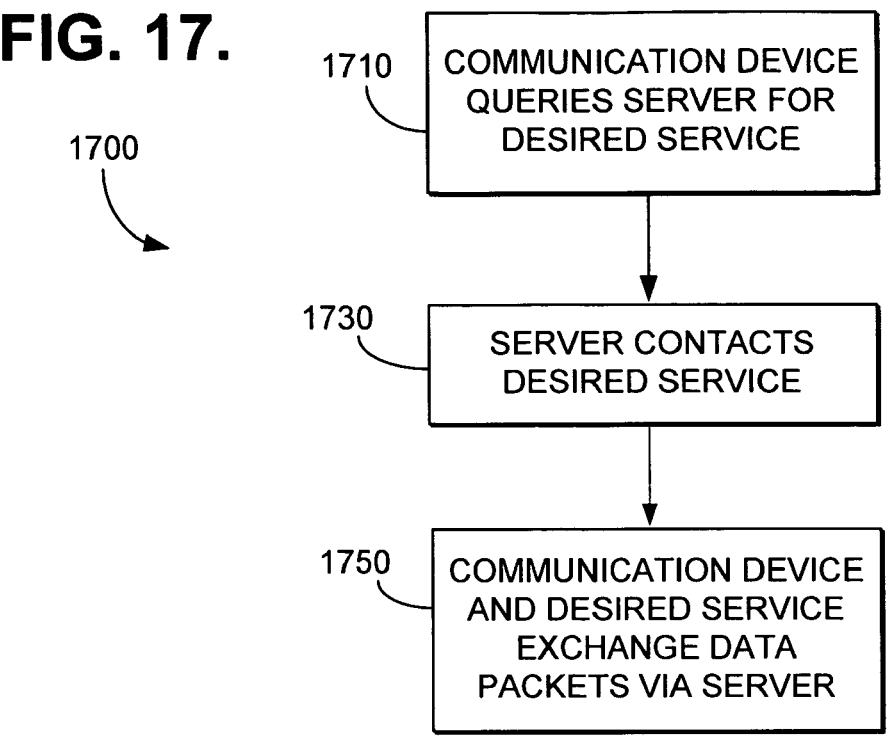
FIG. 17 illustrates a method in accordance with the present invention for directing a communication device to a desired service.

FIG. 17 illustrates a method 1700 in accordance with the present invention for directing a communication device to a desired service. Method 1700 may be used when a communication device requires a given service. In step 1710, a communication device may query the server for a desired service. The query may occur through an exchange of data packets between the communication device and server. In step 1730, the server may contact the desired service. The server may, for example, maintain information regarding available services. In step 1750, the communication device and the desired service may exchange data packets via the server. Hence, the server may act as an intermediary allowing the service and communication device to communicate, and in turn, provide the desired service to the communication device.

Figure 18:
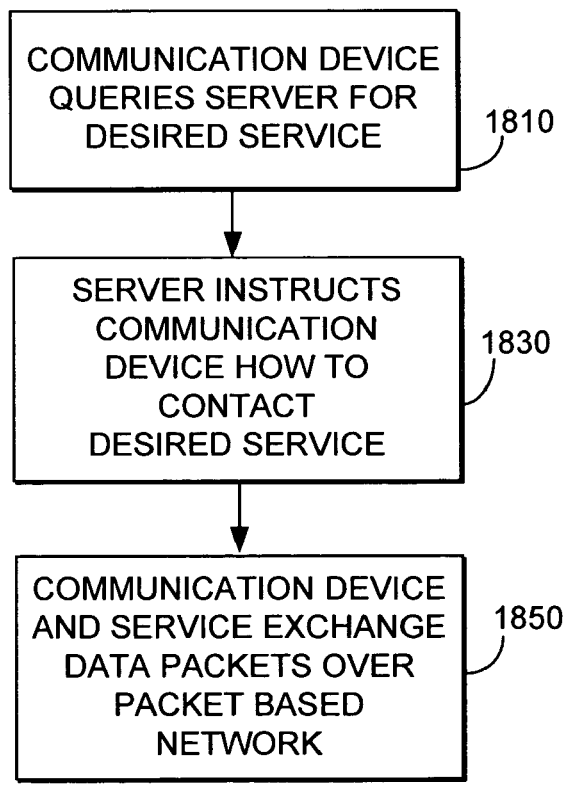
FIG. 18 illustrates a further method in accordance with the present invention for directing a communication device to a desired service.

In FIG. 18, a further method 1800 in accordance with the present invention for directing a communication device to a desired service is illustrated. Method 1800 may be used when a communication device requires a given service. In step 1810, a communication device may query the server for a desired service. The query may occur through an exchange of data packets between the communication device and server. In step 1830, the server may exchange data packets with the communication device instructing the communication device how to contact the desired service. The server may, for example, maintain information regarding available services. The communication device may then use the instructions provided by the server to exchange data packets with the desired service in step 1850 to establish the desired service to the communication device.

Figure 19:
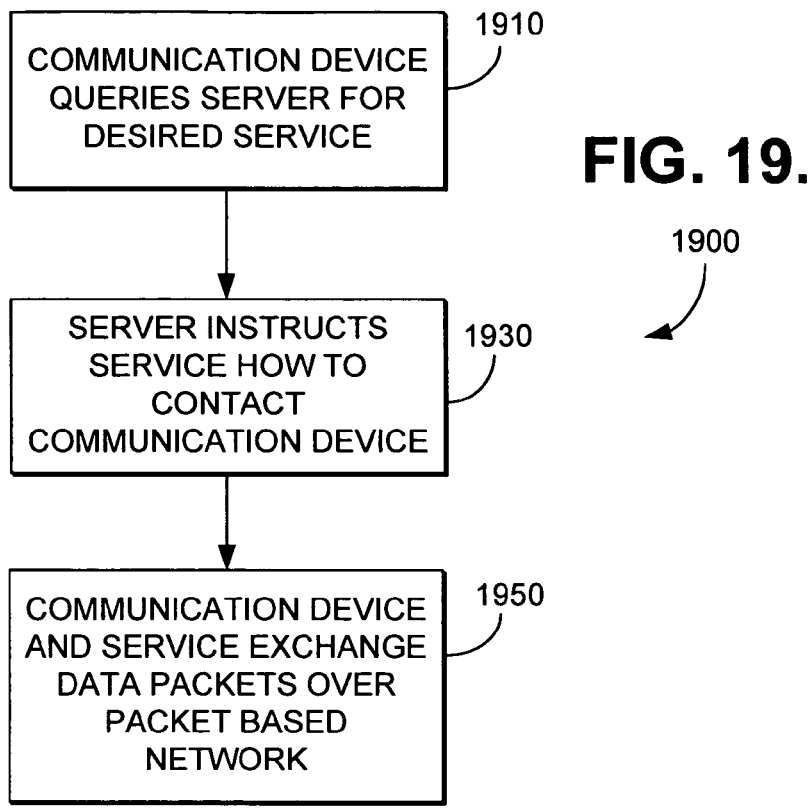
FIG. 19 illustrates a further method in accordance with the present invention for directing a communication device to a desired service.

In FIG. 19, a further method 1900 in accordance with the present invention for directing a desired service to contact a communication device is illustrated. Method 1900 may be used when a communication device requires a given service. In step 1910, a communication device may query the server for a desired service. The query may occur through an exchange of data packets between the communication device and server. In step 1930, the server may exchange data packets with the desired service instructing the desired service how to contact the communication device requesting the service. The server may, for example, maintain information regarding available services. The desired service may then use the instructions provided by the server to exchange data packets with the communication device desiring the services in step 1850 to establish the desired service with the communication device.

Figure 20:
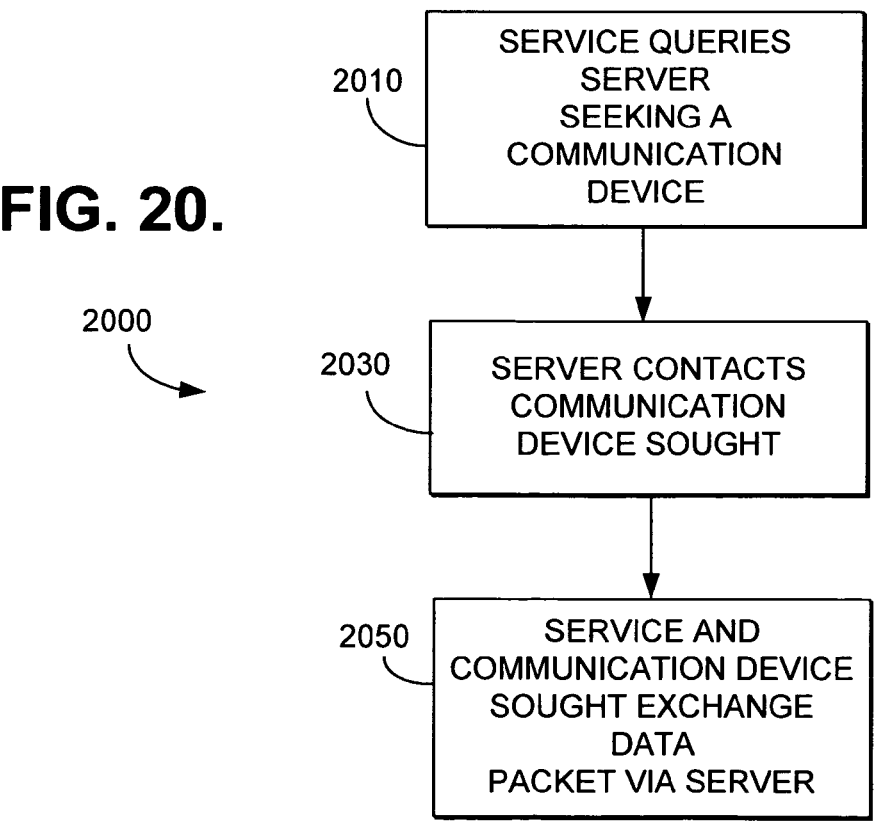
FIG. 20 illustrates a method in accordance with the present invention for directing a service to a communication device.

FIG. 20 illustrates a method 2000 in accordance with the present invention for directing a service to a desired communication device. Method 2000 may be used when a service requires a given communication device. In step 2010, a service may query the server for a desired communication device. The query may occur through an exchange of data packets between the service and server. In step 2030, the server may contact the desired communication device. The server may, for example, maintain information regarding available communication devices. In step 2050, the service and the desired communication device may exchange data packets via the server. Hence, the server may act as an intermediary allowing the service and communication device to communicate, and in turn, provide the desired communication device to the service.

Figure 21:
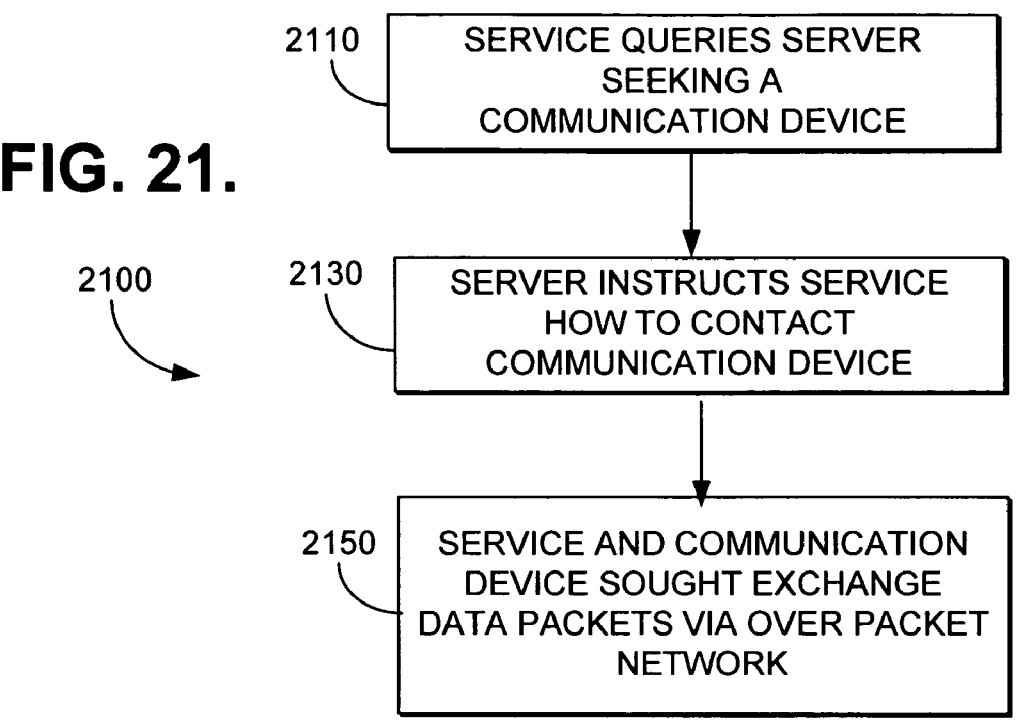
FIG. 21 illustrates a further method in accordance with the present invention for directing a service to a communication device.

In FIG. 21, a further method 2100 in accordance with the present invention for directing a service to contact a desired communication device is illustrated. Method 2100 may be used when a service requires a given communication device. In step 2110, a service may query the server for a desired communication device. The query may occur through an exchange of data packets between the service and server. In step 2130, the server may exchange data packets with the service instructing the service to contact the desired communication device. The server may, for example, maintain information regarding available communication devices. The service may then use the instructions provided by the server to exchange data packets with the desired communication device in step 2150 to establish the service with the desired communication device.

Figure 22:
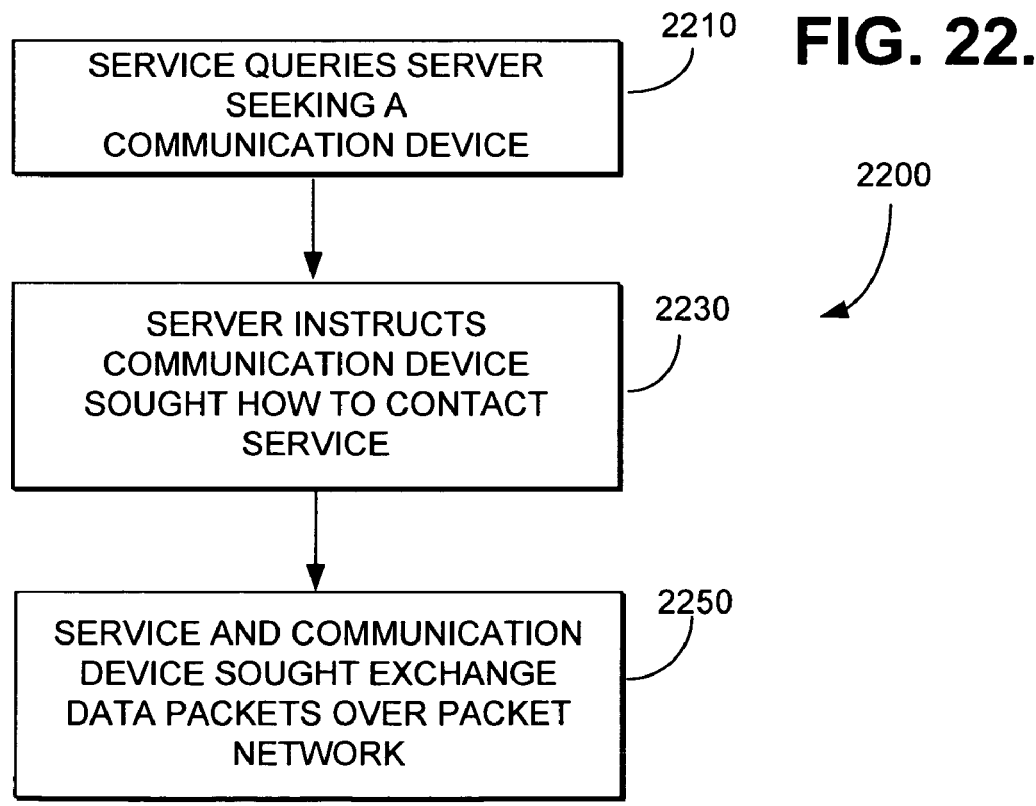
FIG. 22 illustrates a further method in accordance with the present invention for directing a service to a communication device.

In FIG. 22, a further method 2200 in accordance with the present invention for directing a desired service to a desired communication device is illustrated. In step 2210, a service may query the server for the desired communication device. Method 2200 may be used when a service requires a given communication device. The query may occur through an exchange of data packets between the service and server. In step 2230, the server may exchange data packets with the desired communication device instructing the desired communication device how to contact the service requesting the device. The server may, for example, maintain information regarding available communication devices. The desired communication device may then use the instructions provided by the server to exchange data packets with the service desiring the communication device in step 2250 to establish the service with the desired communication device.

It should be appreciated that the above sets forth illustrative examples of telecommunication networks comprising packet-based networks and circuit-based networks. The present invention is not limited to any particular type of communication device, server, service, or network used, nor is it limited to any given network protocol or architecture. Many aspects of the present invention may be implemented using computer software embodied on computer readable media to be executed on a computer or other machine. The use of such computer software may be particularly useful for establishing communication between the wide variety of different network communication devices and services. The present invention is not limited to the use of any particular computer or other machine to execute the machine readable code. These and other variations will be apparent to one of ordinary skill in the art.

What is claimed is:

1. A communication system for exchanging packet based information with a plurality of communication devices, the communication system comprising:
 a packet based communication network that transmits packets of data; and
 a server operable to:
  direct a communication device to services by receiving data packets from the communication device identifying the desired services and transmitting data packets to the communication device instructing the communication device how to access the desired service; and
  directing services to a communication device by receiving data packets from a service intended for the communication device and transmitting data packets to the communication device instructing the device how to access the service.

2. The communication system of claim 1, wherein the server is further operable to authenticate a communication device.

3. The communication system of claim 2, wherein the server is further operable to establish a secure packet exchange with a communication device.

4. The communication system of claim 3, wherein the server is further operable to establish a connection through the network between a first communication device and a second communication device.

5. The communication system of claim 4, wherein the server is further operable to convert between a packet based network connection and a circuit-based connection.

6. A communication system for exchanging packet based information with communication devices, the communication system comprising:
at least one server operable to:
receive data packets from communication devices;
authenticate data packets received from communication devices;
direct communication devices to services by receiving data packets from a communication device identifying a desired service and transmitting data packets to the communication device instructing the communication device how to access the desired service; and
direct services to a communication device;
at least one communication device operable to:
transmit data packets authenticating the communication device to the at least one server;
transmit data packets to the at least one server identifying a desired service;
receive data packets from the server instructing the communication device how to access a service; and
perform instructions in data packets received from the server instructing the communication device how to access a service; and
a packet based communication network that carries data packets between the at least one server and the at least one communication device.

7. The communication system of claim 6, wherein the at least one server operable to direct services to a communication device further comprises at least one server operable to:
receive data packets from a service seeking a communication device; and
transmit data packets received from a service seeking a communication device to the communication device sought.

8. The communication system of claim 6, wherein the at least one server operable to direct services to a communication device further comprises at least one server operable to:
receiving data packets from a service seeking a communication device; and
transmit data packets to the service seeking a communication device, the data packets instructing the service how to contact the communication device sought.

9. The communication system of claim 6, wherein the at least one server operable to direct services to a communication device further comprises at least one server operable to:
receive data packets from a service seeking a communication device; and
transmit data packets to the communication device sought by the service, the data packets instructing the communication device how to contact the service seeking the communication device.

10. The communication system of claim 6, wherein the at least one server operable to direct services to a communication device further comprises at least one server operable to:
receive data packets from a service seeking a communication device;
determine whether to direct the service to the communication device by relaying data packets from the service and, if so, to transmit data packets received from a service seeking a communication device to the communication device sought;
determine whether to direct the service to the communication device by instructing the service how to contact the communication device and, if so, to transmit data packets to the service seeking a communication device, the data packets instructing the service how to contact the communication device sought; and
determine whether to direct the service to the communication device by instructing the communication device how to contact the service and, if so, to transmit data packets to the communication device sought of the service, the data packets instructing the communication device how to contact the service seeking the communication device.

11. The communication system of claim 6, wherein:
the at least one communication device operable to transmit data packets authenticating the communication device to the at least one server further comprises at least one communication device operable to:
transmit data packets to the at least one server uniquely identifying the communication device transmitting the data packets; and
transmit data packets to the at least one server informing the server how to transmit data packets to the communication device; and
the at least one server operable to authenticate data packets received from a communication device further comprises at least one server operable to:
receive data packets from a communication device uniquely identifying the communication device;
identifying a communication device using received data packets uniquely identifying the communication device;
receiving data packets from a communication device informing the server how to transmit data packets to the communication device; and
retaining information describing how to transmit data packets to the communication device until new information describing how to transmit data packets to the communication device is received by the server.

12. The communication system of claim 6, wherein the packet based communication network comprises an IP network.

13. The communication system of claim 12, wherein:
the at least one server is further operable to assign a dynamic IP address to a communication device; and
the at least one communication device is further operable to receive a dynamic IP address from the at least one server.

14. The communication system of claim 12, wherein:
the at least one communication device is further operable to:
maintain a static IP address; and
transmit the static IP address to the at least one server; and
the at least one server is further operable to receive the static IP address of a communication device.

15. The communication system of claim 12, wherein:
the at least one communication device is further operable to establish and maintain a secure exchange of data packets with the at least one server; and
the at least one server is further operable to establish and maintain a secure exchange of data packets with the communication device.

16. The communication system of claim 15, wherein:
the at least one communication device operable to establish and maintain a secure exchange of data packets with the at least one server further comprises at least one communication device operable to establish a virtual private network tunnel with the at least one server.

17. A method for packet based communication using a communication device, the communication device being able to exchange data packets with at least one server over a packet based communication network, the method for packet based communication comprising:
  providing server and authentication information to a communication device;
  transmitting packet based authentication information from the communication device over the packet based communication network to the server;
  uniquely identifying the communication device by a server using the packet based authentication information;
  directing the communication device to services;
  directing services seeking the communication device to the communication device;
  establishing and maintaining a secure exchange of data packets between the communication device and the at least one server,
  wherein directing services seeking the communication device to the communication device includes: receiving data packets from a service seeking a communication device identifying the communication device sought, transmitting data packets from the at least one server to the communication device sought instructing the communication device how to contact the service seeking the communication device, and transmitting data packets between the service and the communication device.

18. The method for packet based communication of claim 17, wherein directing the communication device to services comprises:
  transmitting data packets from the communication device to the at least one server identifying the service desired by the communication device;
  transmitting data packets from the at least one server to the communication device, the data packets instructing the communication device how to contact the desired service.

19. The method for packet based communication of claim 17, wherein directing the communication device to services comprises:
  transmitting data packets from the communication device to the at least one server identifying the service desired by the communication device;
  transmitting data packets from the at least one server and the service desired by the communication device; and
  exchanging data packets between the communication device and the service via the at least one server.

20. The method for packet based communication of claim 17, wherein directing services seeking the communication device to the communication device further includes:
  receiving data packets from a service seeking a communication device identifying the communication device sought;
  transmitting data packets received from a service seeking a communication device to the communication device sought; and
  exchanging data packets between the communication device and the service via the at least one server.

21. The method for packet based communication of claim 17, wherein directing services seeking the communication device to the communication device further includes:
  receiving data packets from a service seeking a communication device identifying the communication device sought;
  transmitting data packets from the at least one server to the service instructing the service how to contact the communication device sought; and
  transmitting data packets between the service and the communication device.

* * * * *